United States Patent [19]

DeLuca

[11] Patent Number: 5,387,056
[45] Date of Patent: Feb. 7, 1995

[54] METHOD FOR TREATING DREDGING SPOILS FOR SALT CONTAMINATION

[75] Inventor: Joseph A. DeLuca, Galveston, Tex.

[73] Assignee: DeLuca Services, Inc., Galveston, Tex.

[21] Appl. No.: 92,783

[22] Filed: Jul. 19, 1993

[51] Int. Cl.$^6$ ............................................... C02F 1/00
[52] U.S. Cl. ...................... 405/128; 71/903; 210/751; 405/263
[58] Field of Search ............... 405/128, 129, 263, 258; 71/13, 24, 29, 30, 903, 27, 63, 64.08; 210/170, 747, 751, 610

[56] References Cited

U.S. PATENT DOCUMENTS

| | | | |
|---|---|---|---|
| 2,860,448 | 11/1958 | Carasso | 71/903 X |
| 4,012,219 | 3/1977 | Josephs | 71/903 |
| 4,687,505 | 8/1987 | Syllings et al. | 71/903 X |
| 4,755,206 | 7/1988 | Clark | 71/27 |
| 5,008,019 | 4/1991 | Trost | 405/263 X |
| 5,028,252 | 7/1991 | Kaes | 71/903 X |
| 5,100,455 | 3/1992 | Pinckard et al. | 71/903 X |
| 5,139,555 | 8/1992 | Freepons | 71/903 X |
| 5,192,163 | 3/1993 | Fleming | 405/128 |

Primary Examiner—Dennis L. Taylor
Attorney, Agent, or Firm—Harrison & Egbert

[57] ABSTRACT

A method of treating dredging spoils for salt contamination having the steps of passing the dredging spoils to a containment area, mixing a solution of calcium and nitrate ions with the dredging spoils, reacting the solution with the dredging spoils so as to form sodium chloride, and draining the liquid component and the sodium chloride from the containment area. The containment area is formed for the receipt of the dredging spoils and piping is extended from a dredge to the containment area so that the dredging spoils can be passed to the containment area. The solution of calcium and nitrate ions is pumped into the flow of dredging spoils toward the containment area. The step of draining includes installing a drainage tile into the containment area below a top surface of the containment area and passing the liquid component and the sodium chloride through the drainage tile to a liquid containment area. The liquid containment area may be the body of water from which the dredging spoils were taken.

15 Claims, 1 Drawing Sheet

METHOD FOR TREATING DREDGING SPOILS FOR SALT CONTAMINATION

TECHNICAL FIELD

The present invention relates to methods for the treatment of salt-contaminated soils for reducing the level of salt contamination. More particularly, the present invention relates to methods for the removal of salt from dredging spoils.

BACKGROUND ART

The term "dredging" is commonly associated with procedures for excavating relatively large quantities of subaqueous materials. Dredging normally has four principal objectives: (1) to develop and maintain greater depth than naturally exists for canals, rivers, and harbors; (2) to obtain fill to raise the level of low lands and thus create new land areas and improved drainage and sanitation; (3) to construct dams, dikes, and other control works for streams and sea shores; and (4) to recover subaqueous deposits or marine life having commercial value, such as precious metals and minerals, shell fish for food and pearls, coral and sponges, sand and gravel, and fertilizer.

The material to be removed by dredging operations is usually derived from one of two sources or from a combination of both. In harbors at the mouths of rivers, quantities of silt are carried down in suspension and tend, partly because of the deceleration of the flow in the increased waterway available and partly because of the effects of increasing salinity, to be deposited at the mouth, usually the site of harbor works.

In areas in which the deposited silt is highly mobile and accumulates in considerable quantities, it can be economically removed by a suction dredge, which pumps water mixed with silt into hoppers. By adjustment of the capacity of the hopper to the rate of flow from the pump, the water can be made to remain in the hopper long enough to deposit most of the silt. Careful design of the pumping machinery is required to assume a continuous mixture of maximum silt with minimum water.

The early suction dredges generally operated from moored positions in the same manner as bucket-ladder dredges, but a less elaborate system of moorings generally sufficed because the levelling of the seabed could be left to occur naturally through the mobility of the material. A marked advance was achieved by the elimination of much of the lifting and laying of moorings through the development of the trailer suction dredge. The craft has the capacity to dredge while on the move and cruises up and down the waterway or other area, sucking up silt as it goes.

Dredges are characteristically designed to deliver their output either overside into attendant hopper barges or, in the case of self-propelled dredges, into hopper compartments incorporated in their own structure. These compartments are essential in the case of trailing suction dredges, but their value, in other cases, depends on the circumstances and the method of disposal of the spoils. When a long journey to the depositing area is involved, it is generally more economical to leave the dredge continuously at work and remove the spoil in separate barges. When the journey is short and the spoil is to be simply dumped, for which purpose the hoppers are provided with bottoms that fall open, then an economical work cycle between dredging area and spoiling ground, using one craft only, can frequently be established.

Dredged spoil is less and less often disposed of by dumping out at sea, a practice which was once almost universal. Instead, dredging spoils are being used with the reclamation of land from the sea and foreshore. This process has been stimulated by the rise in the value of the land so created and by the discovery that, in many instances, spoil taken out to sea frequently returns. A variety of procedures have been developed for the combined operation of dredging and reclamation. Where the area to be dredged and the area to be reclaimed are in close proximity, as often happens, the whole operation can be carried out by a single suction dredge pumping ashore through a floating pipeline. When, as is more often the case, there is a considerable distance between the two sides, transport in hopper barges is more economical. At the reclamation site, the barges can either be pumped out by a suction reclamation unit, or occasionally can dump their loads on the bottom; from there the material can be pumped ashore by the unit acting as a stationary suction dredge.

Unfortunately, one of the main problems with the reclamation of land by the use of the dredging spoils is the salinity of the dredging spoils. This is particularly the case where the dredging spoils are taken from a salt water or brine environment. The salt contamination of the silt, which is removed in the dredging operations, effectively prevents the use of such soil for effective purposes, such as for agriculture. It is extremely difficult to grow crops on salt contaminated soil. Normally, the dredging spoils will take approximately fifteen to twenty years to become naturally reclaimed. In the meantime, such dredging spoils are essentially dead land, unusable for virtually all purposes.

There are serious costs associated with the unloading of dredging spoils onto land. First, and foremost, there is the cost associated with the land itself. Whenever it is desired to reclaim the dredging spoils by placing them on land (as opposed to being dumped at sea), then an adequate area of land must be found. The land which is used in the dredging operations is often close to the harbor areas and is relatively expensive. Additionally, the continued dumping of the dredging spoils onto the land will effectively kill the previously viable land onto which it is dumped. Alternatively, if an area of land is used for the receipt of dredging spoils, and the spoils are removed from the land and loaded onto a barge, then there are extreme costs associated with the loading of the material onto the barge, for the use of the barge, and for the unloading of the barge. Often, taxes and other fees are required for those that chose to dump the dredging spoils onto the land.

Another important factor is that even when a land area is provided for the receipt of dredging spoils, there is continual leaching of the salt from the containment area. Any leaching of the salt from the containment area will effectively kill the land surrounding the containment area.

There have been various efforts in the past to use organics and fertilizers for the treatment of such dredging spoils. Although such organics are useful for the reclamation of the dredging spoils, the use of such organics and fertilizers is very expensive. The salt-contaminated dredging spoils will rot the organics and the fertilizers and also create methane gas problems. The salt, in the dredging spoils, will effectively kill the nutrients. Any clay particles in the silt of the dredging spoils will tend to attack and hold onto the salt by cation exchange. The reclamation of the dredging spoils requires approximately ten times the amount of fertilizers and organics than would be required for the reclaiming of salt-free dredging spoils.

Even when the dredging operation occurs in fresh water areas, such as rivers, streams, and lakes, there is still the problem of salt contamination. Often, there is a salt runoff that has accumulated on the bottom of the water over a period of time. The silts and clays at the bottom of the body of water will tend to receive any salts that are passed into the fresh water. As a result, the dredged silts will still have structural problems and dispersion difficulties.

In the past, there have no efforts to remove the salt contamination from the dredging spoils. A typical solution to the problem of salt contamination of dredging spoils has been simply to place large amounts of fertilizers and organics onto the dredging spoils. Occasionally, a layer of top soil has been placed over the dredging spoils in an effort to reclaim the area. This is counterproductive in that the top soil is often ruined by its close association with the salt contaminated spoils.

It is object of the present invention to provide a method which is effective for the removal of salt from the dredging spoils.

It is another object of the present invention to provide a method that allows for the reclamation of the dredging spoils into a useful soil.

It is another object of the present invention to provide a method that reduces salt contamination to areas surrounding the dredging spoils.

It is still a further object of the present invention to provide a method that is easy to use and cost effective.

These and other objects and advantages of the present invention will become apparent from a reading of the attached specification and appended claims.

SUMMARY OF THE INVENTION

The present invention is a method of treating dredging spoils for salt contamination that comprises the steps of (1) passing the dredging spoils to a containment area; (2) mixing a solution of calcium and nitrate ions with the dredging spoils; (3) reacting the solution with the dredging spoils; and (4) draining the liquid component and the salt from the containment area.

The method of the present invention further includes the step of forming a containment area for the receipt of the dredging spoils, and extending piping from a dredge to the containment area. The piping is used to pass the dredging spoils to the containment area. Specifically, a drainage tile is installed into the containment area below a top surface of the containment area. The drainage tile is used for the removal of the liquid component and the salt from the containment area.

The step of passing the dredging spoils includes the steps of (1) dredging the dredging spoils from a body of water; and (2) pumping the dredging spoils through piping from the body of water to the containment area. The solid components of the dredging spoils are silts, sand and clays. The liquid component of the dredging spoils includes salt water.

The step of mixing includes the formation of a diluted solution of calcium nitrate which is mixed with water in a proportion in which one part of calcium nitrate is mixed with between fifty and five thousand parts of water. An anionic polymer can be introduced to the solution of calcium and nitrate ions prior to the step of mixing the solution with the dredging spoils. The solution of calcium and nitrate ions is pumped into a flow of the dredging spoils. The step of draining includes the installation of the drainage tile into the containment area below a top surface of the containment area, and a passing of the liquid component and the salt through the drainage tile to a liquid containment area. The liquid containment area can be the body of water from which the dredging spoils are taken.

So as to further reclaim the dredging spoils, soil nutrients are added to the dredging spoils within the containment area. These soil nutrients include fertilizers and organics which are applied into and atop the dredging spoils in the containment area.

DETAILED DESCRIPTION OF THE INVENTION

Figure 1:
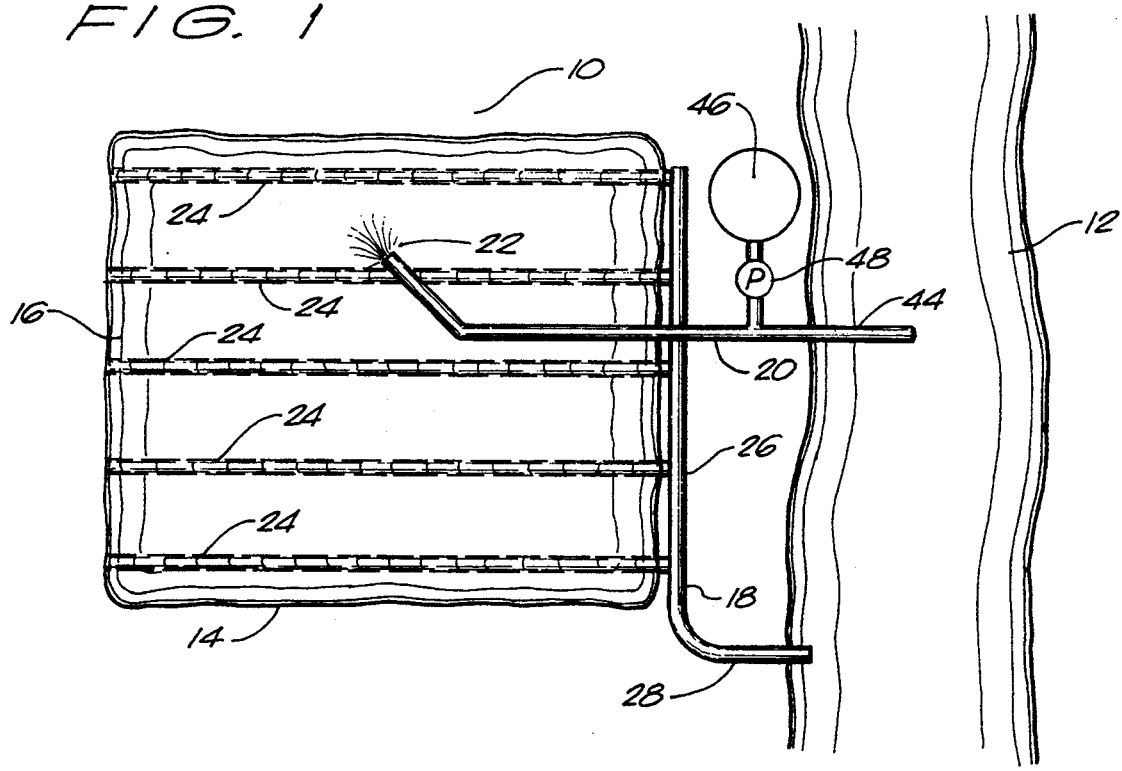
FIG. 1 is a plan view showing the arrangement of the body of water, the containment area, and the pumping system for the treatment of salt-contaminated dredging spoils.

Referring to FIG. 1, there is shown at 10 the system of the present invention for the treatment of the dredging spoils. Specifically, as seen in FIG. 1, there is shown the body of water 12, the containment area 14, the dredging spoils 16 in the containment area 14, the drainage system 18, and the pumping system 20 for the delivery of the dredging spoils to the containment area 14 and for the mixing of a solution of calcium and nitrate ions with the dredging spoils.

The body of water 12, as illustrated in FIG. 1, is illustrated as a river. However, and importantly, this should not be construed as a limitation on the present invention. Dredging operations are carried out in a wide variety of different types of bodies of water. In particular, and as stated previously, dredging operations are carried out in harbor areas, on near-shore areas, in lakes, in rivers, streams, and other bodies of water. As such, the use of the term "body of water" herein should refer to all types of bodies of water into which dredging operations are carried out. The body of water 12 is positioned generally adjacent to the containment area 14. However, in many cases, this will not occur. Often, the containment area 14 is positioned a great distance from the body of water 12. The pumping system associated with the dredging operation can deliver the dredging spoils a relatively large distance to the containment area 14. The proximity of the containment area 14 to the body of water 12 will determine the type of drainage system 18 employed. If the containment area 14 is very close to the body of water 12, then the containment area 14 may allow for natural drainage into the body of water 12. In other cases, it may be necessary to establish a separate liquid containment system for the receipt of any drainage from the containment area 14.

The containment area 14 is an area that has been developed for the receipt of the dredging spoils 16. In some cases, the containment area 14 is nothing but a flat area of land onto which the dredging spoils 16 are delivered. Typically, the dredging system 20 will deliver the dredging spoils onto a top surface of the containment area 14. In other circumstances, the containment area 14 can be a hole which is formed in the earth for the receipt of the dredging spoils 16. Liners and other items can be placed between the surface of the containment area 14 and the area exterior of the containment area 14.

The dredging spoils 16 are delivered by the dredging system 12 through opening 22 onto a top surface of the containment area 14. The dredging spoils 16 typically include the silts that are removed from the bottom of the body of water 12. The silt which is delivered into the containment area 14 is typically a solid component of the dredging spoils. The dredging spoils 16 will also include a liquid component that is delivered through the dredging system 20 to the containment area 14. This liquid component is normally salt water which is passed, with the silt, into the containment area 14.

A drainage system 18 is incorporated within the containment area 14. As can be seen, the drainage system 18 is comprised of a plurality of drainage tiles 24. The drainage tiles 24 extend across the containment area 14 and communicate with a pipe 26. The drainage tiles 24 are sections of tubing that have a plurality of perforations extending therealong. The perforations in the drainage tiles 24 are suitable for the receipt of a liquid component of the dredging spoils 16. Because the drainage tiles 24 are placed at the bottom of the containment area 14, the liquid component of the dredging spoils will migrate toward the bottom of the containment area 14 and will pass into the drainage tiles 24. The drainage tiles 24 can be slightly inclined so that the liquid component will pass into pipe 26 and outwardly through the exit pipe 28. As can be seen, the pipe 26 extends to and communicates with the exit pipe 28. The exit pipe 28 is positioned so as to deliver the liquid component into the body of water 12. Since the present invention utilizes a drainage system 24, the liquid component can be easily removed from the containment area 24. However, within the scope of the present invention, if the containment area 24 is simply s flat piece of land, then the drainage system 18 of the present invention can simply be the natural drainage that would occur from the passing of liquids from the dredging spoils 16 toward the body of water 12. This is particularly the case if the containment area 14 is positioned close to the body of water 12. In such s circumstance, the natural drainage of the liquids from the dredging spoils 16 will cause the liquid component to flow into the body of water 12 without the need for the drainage system identified with the drainage tiles 24, the pipe 26, and the exit pipe 28.

Figure 2:
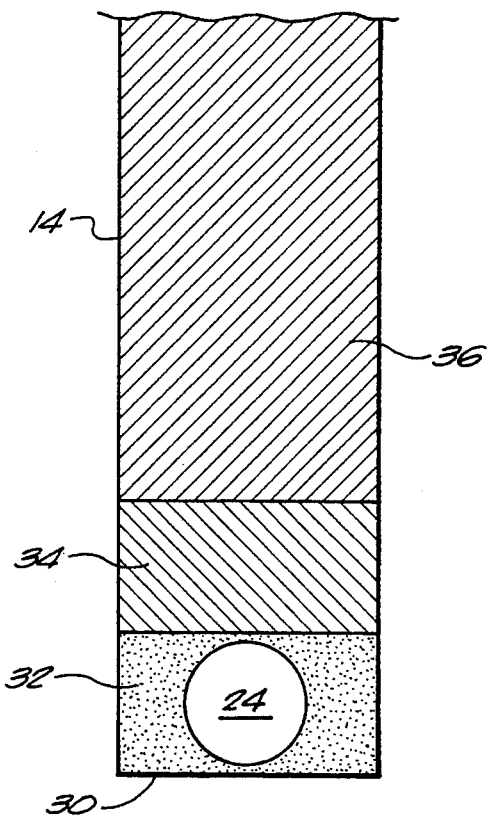
FIG. 2 is a cross-sectional view of the containment area as illustrated in FIG. 1.

Referring to FIG. 2, there is illustrated a cross-sectional view of the containment area 14. As can be seen, the drainage tile 24 is positioned generally adjacent to the bottom 30 of the containment area 14. In the arrangement shown in FIG. 2, the drainage tile 24 is a tubular member which is positioned within a sand and gravel area 32. Granular soil 34 is placed over this layer of sand and gravel on top of the drainage tile 24. Finally, the dredging spoils 36 can be placed upon this level of granular soil. As such, the liquid component of the dredging spoils will slowly drain through the silt 36, through the granular soil 34, through the sand and gravel 32, and into the drainage tile 24. This arrangement of drainage tile is defined in ASTM Designation F 449-85 identified as "Subsurface Installation of Corrugated Thermoplastic Tubing for Agricultural Drainage or Water Table Control".

Figure 3:
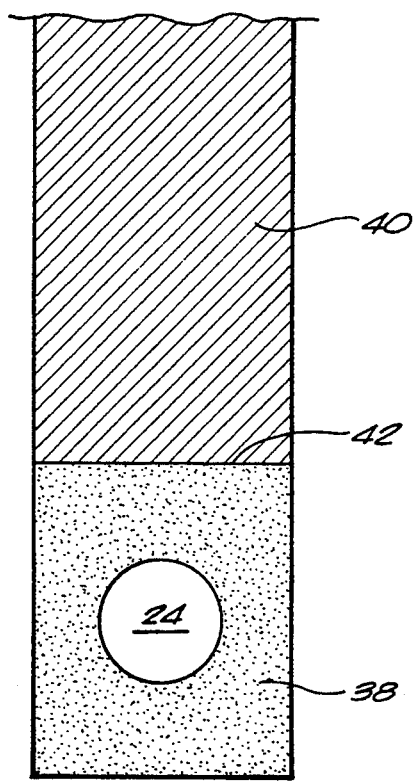
FIG. 3 is a cross-sectional view of an alternative embodiment of the containment area illustrated in FIG. 1.

Similarly, FIG. 3 shows an alternative embodiment of the arrangement of FIG. 2. Specifically, in the embodiment of FIG. 3, the drainage tile 24 is positioned in a large area of sand and gravel 38. As can be seen, the drainage tile 24 is positioned generally centrally of the cross-section of the sand and gravel 38. The silt material 40 is placed on the top surface 42 of the sand and gravel 38. This arrangement permits the liquid component of the dredging spoils 16 to pass through the sand and gravel 38, but restricts the fine particles of silt and sand. As such, the silt and sand will reside above the top surface 42 of the sand and gravel. The specifications relating to the design of the system of FIG. 3 are also identified in ASTM Designation F 449-85. In this configuration, the drainage tile 24 presents an effective technique for the removal of the liquid component from the dredging spoil 16. Various other configurations of drainage systems can also be employed within the concept of the present invention.

Referring to FIG. 1, there is, importantly, shown the dredging system 20. As described herein, the dredging system 20 is a suction dredging system. An pipe line 44 is provided which extends from the body of water 12 to the containment area 14. Although the pipe line 44 describes one technique for the passage of the dredging spoils from the body of water 12, it is possible that the pipe line 44 can also pertain to the delivery of the dredging spoils by barge, or by other technique. For example, if other techniques of dredging are employed, the pipe line 42 can be suitably connected so as to pass the barged dredging spoils from the barge toward the containment area 14. Suitable pumping is provided so as to allow for the passage of the solid component (silt) and the liquid component (sea water) through the pipe line 44 toward the outlet 22.

Importantly, in FIG. 1, there is shown a container 46 of a solution of calcium and nitrate ions. In particular, container 46 will contain a calcium nitrate solution which is diluted so that the calcium nitrate is mixed with fresh water in amount of one part to between fifty and five thousand parts of water. A pump 48 is interconnected between the container 46 and the pipe line 44. As dredging spoils are passed through pipe line 44 toward outlet 22, the pump 48 is activated so as to draw the solution of calcium and nitrate ions toward the flow of the dredging spoils. During this action, the solution is mixed with the dredging spoils. Such mixture will cause a reaction between the calcium and nitrate ions and the salt contained within the dredging spoils.

The solution of calcium and nitrate ions can also include an anionic polymer. It is also possible to include a surfactant or wetting agent. This composition is produced in a concentrated form and may be produced using a source of calcium and nitrate ions, either calcium nitrate or a mixture of calcium and ammonium nitrate, as the primary component of this solution. When a calcium and ammonium nitrate mixing is used as the primary component, it may be obtained in the form of granules commercially available from Norsk Hydro of New York. Norsk Hydro indicates that this mixed composition is $5Ca(NO_3)_2 \cdot NH_4NO_3 \cdot 10H_2O$ which is typically coated with a waxy additive intended to protect the nitrate mixture from moisture in the ambient atmosphere. Alternatively, either calcium nitrate and/or ammonium nitrate may be used.

The anionic polymers useful in the present invention are preferably of medium molecular weight, i.e. those having a molecular weight of from about 6 to about $15 \times 10^6$. The most preferred medium molecular weight polymers are the acrylamide copolymers manufactured by a Stockhausen, Inc. of Greensborough, N.C. under the trade names PRAESTOL (TM) A335FL or A3040LTR having molecular weights of about $8 \times 10^6$.

The solution as used in the present invention may be prepared by dissolving the commercially available, wax coated granulated calcium or ammonium nitrate mixing obtainable from Norsk Hydro in water while stirring. Once a solution has been obtained, twenty to twenty-five percent of the total quantity of the anionic polymer required is added with agitation to the nitrate solution and the mixture is then allowed to settle. The anionic polymer is typically purchased in solution form wherein the polymer is present at about twenty-five–thirty weight percent. Impurities, such as sand and clay, precipitate out and may be separated from the supernatant liquid either by removing the precipitate or decanting the supernatant solution. The remaining seventy-five to eighty percent of the anionic polymer is then added to the supernatant solution with mixing until the waxy coating substance has flocculated to the surface of the solution. The waxy flocculent is then skimmed from the surface of the solution before it sinks to the bottom of the mixing tank.

While the above process description is directed to the commercially available wax-coated nitrate composition sold by Norsk Hydro, it is clear that other nitrate compositions would also be suitable for use. For example, commercially available prills of non-coated calcium and ammonium nitrate mixture, which would not require the wax removal step recited above, would be useful. It is known to produce calcium nitrate by reacting limestone with nitric acid. Thus, the calcium nitrate solution may be produced by this reaction and the ammonium nitrate, and the anionic polymer may be added subsequently, as needed. Further, even though expensive to practice, one might use a mixture of uncoated purified calcium nitrate and ammonium nitrate to prepare the concentrated nitrate mixture without the need for dewaxing or solids removal. Various ratios of calcium nitrate or ammonium nitrate can be employed within the scope of the present invention. Thus, for example, calcium nitrate without ammonium nitrate may be used or varying quantities of ammonium nitrate may be added.

The concentrate of the solution of the present invention may range in combined calcium and ammonium nitrate content from about 50 weight percent to about 67 weight percent based upon the total weight of the concentrated solution. However, it is preferred that the solution be as concentrated as possible to minimize transportation and handling costs by increasing the effectiveness of the solution due to the increased concentration driving force for ion exchange in the soil.

The amount of anionic polymer solution added may range from about 0.025 to about 0.075 weight percent, preferably about 0.05 weight percent. Since the anionic polymer is added to remove the waxy coating composition of the industrial grade calcium nitrate from the solution, the quantity of anionic polymer may be varied depending upon the level of those impurities.

Although the solution of the present invention has been specified as being pumped into and mixed integrally with the flow of the dredging spoils from the dredged body of water, the solution of the present invention can also be applied to the dredging spoils by conventional means, such as, for instance, spraying the solution onto the dredging spoils or flooding the dredging spoils with the solution. The level of the solution which is added to the salt-contaminated silt is dependent upon the extent to which the silt has been contaminated so that widely varying quantities of the solution may be required.

The solution of the present invention has been found to be very effective for the removal of salt-contamination. When the solution containing the calcium and nitrate ions is interacted with the dredging spoils within the pipe line 20, the sodium is displaced with the calcium. This exchange will occur within the pipe line. As a result, it is possible to leach out the sodium and the calcium. Nitracidification occurs almost immediately with respect to the calcium nitrate. The sodium chloride will go into the drainage system 18. Since the calcium makes a quick ion exchange, there is little or no calcium drainage.

As a result of the use of the present invention, the dredging spoils are effectively treated for the removal of salt contamination. By the removal of the salt from the dredging spoils 16, a soft composition of silt remains. In order to bring the dredges silt and clays back to life, it is necessary to add nutrients to the soil. These nutrients can be organics and/or fertilizers. The use of organics and fertilizers gives structural fertilization to the soil. After approximately one month, the silt will effectively bioreact with the nutrients and organics so as to allow it to support agriculture.

Through the operation of the method of the present invention, the salt contamination has effectively been removed from the dredging spoils. As a result, the remaining silt is a sellable product. Often, the reclaimed dredging spoils can be sold to other locations for use as a top soil material. As a result, the sale of the treated dredging spoils can offset the cost of dredging and treating.

Alternatively, the treated dredging spoils can remain in the containment area. Since the dredging spoils will now support agriculture, the land can be put to productive use. Since the salt has been removed, there will be no contamination and destruction of the surrounding lands. As a result, the dredging has effectively produced productive and usable land. In normal use, since the land has not been destroyed, the cost of land acquisition and use should be minimized. In contrast to the present methods of dredging, the present invention converts the dredging spoils into effective productive soil.

The foregoing disclosure and description of the invention is illustrative and explanatory thereof. Various changes in the details of the described method can be made within the scope of the appended claims without departing from the true spirit of the invention. The present invention should only be limited by the following claims and their legal equivalents.

I claim:

1. A method of treating dredging spoils for salt contamination comprising the steps of:
   passing the dredging spoils in a flow to a containment area, said dredging spoils having a solid component and a liquid component;
   pumping a solution of calcium and nitrate ions into the flow of the dredging spoils;
   reacting said solution with the dredging spoils; and
   draining said liquid component and salt from said containment area.

2. The method of claim 1, further comprising the step of:

forming the containment area for the receipt of the dredging spoils; and extending piping from a dredge to said containment area, said piping for passing the dredging spoils.

3. The method of claim 2, further comprising the step of:

installing a drainage tile into said containment area below a top surface of said containment area.

4. The method of claim 1, said step of passing comprising:

dredging the dredging spoils from a body of water; and pumping the dredging spoils through piping from said body of water to said containment area.

5. The method of claim 1, said solid component being silt, said liquid component being salt water.

6. The method of claim 1, said solution of calcium and nitrate ions being calcium nitrate, said step of mixing comprising:

forming a diluted solution of calcium nitrate as mixed with between fifty and five thousand parts of water.

7. The method of claim 1, further comprising:

introducing an anionic polymer to said solution of calcium and nitrate ions prior to the step of mixing.

8. The method of claim 1, said step of draining comprising:

installing a drainage tile into said containment area below a top surface of said containment area; and passing said liquid component and said salt through said drainage tile to a liquid containment area.

9. The method of claim 8, said dredging spoils dredged from a body of water, said liquid containment area being said body of water.

10. The method of claim 1, further comprising the step of:

adding soil nutrients to the dredging spoils in said containment area.

11. A method for the reclaiming of dredging spoils comprising:

dredging a body of water so as to remove silt from said body of water;

passing said silt and water from said body of water to a containment area;

mixing a solution of calcium and nitrate ions with said silt and water as said silt is passed to said containment area; and draining liquid from said containment area, said liquid including water and salt.

12. The method of claim 11, further comprising the step of:

adding a soil nutrient to said silt in said containment area.

13. The method of claim 11, said step of mixing comprising:

forming a diluted solution of calcium nitrate which is mixed with water in a proportion in which one part of calcium nitrate is mixed with between fifty and five thousand parts of water.

14. The method of claim 11, said step of mixing comprising:

pumping said solution of calcium and nitrate ions into a flow of the dredging spoils, said flow passing from said body of water toward said containment area.

15. The method of claim 11, said step of draining comprising:

installing a drainage tile into said containment area below a top surface of said containment area; and passing said water and said salt through said drainage tile to said body of water.

* * * * *